United States Patent
Cui et al.

(10) Patent No.: US 11,238,281 B1
(45) Date of Patent: Feb. 1, 2022

(54) LIGHT SOURCE DETECTION IN FIELD OF VIEW

(71) Applicant: Amazon Technologies, Inc., Seattle, WA (US)

(72) Inventors: Chengwu Cui, Redmond, WA (US); Stephen Thomas Safarik, Seattle, WA (US); Yves Albers Schoenberg, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 98 days.

(21) Appl. No.: 15/444,079

(22) Filed: Feb. 27, 2017

(51) Int. Cl.
*G06K 9/00* (2006.01)
*G06K 9/46* (2006.01)
*B64C 39/02* (2006.01)
*B64D 47/08* (2006.01)
*G05D 1/00* (2006.01)
*H04N 13/128* (2018.01)
*H04N 13/296* (2018.01)
*G08G 5/04* (2006.01)

(52) U.S. Cl.
CPC .......... *G06K 9/0063* (2013.01); *B64C 39/024* (2013.01); *B64D 47/08* (2013.01); *G05D 1/0088* (2013.01); *G06K 9/4642* (2013.01); *G06K 9/4661* (2013.01); *H04N 13/128* (2018.05); *H04N 13/296* (2018.05); *B64C 2201/141* (2013.01); *B64C 2201/146* (2013.01); *G08G 5/04* (2013.01)

(58) Field of Classification Search
CPC ............... G06K 9/0063; G06K 9/4642; G06K 9/4661; H04N 13/128; H04N 13/296; B64C 39/024; B64D 47/08; G05D 1/0088

USPC .......................................................... 348/47
See application file for complete search history.

(56) References Cited

U.S. PATENT DOCUMENTS

| | | | |
|---|---|---|---|
| 2005/0018879 A1* | 1/2005 | Ito | G08B 13/19602 382/103 |
| 2007/0221822 A1* | 9/2007 | Stein | B60Q 1/143 250/205 |
| 2012/0262600 A1* | 10/2012 | Velarde | H04N 9/735 348/223.1 |
| 2014/0168474 A1* | 6/2014 | Geiss | A61B 5/0084 348/239 |
| 2014/0198218 A1* | 7/2014 | Afrooze | H04N 5/235 348/229.1 |
| 2015/0324972 A1* | 11/2015 | Hayakawa | H04N 7/183 348/148 |
| 2016/0241768 A1* | 8/2016 | Lokshin | H04N 5/23203 |
| 2016/0366336 A1* | 12/2016 | Kuehnle | H04N 5/23238 |

(Continued)

*Primary Examiner* — Joseph G Ustaris
*Assistant Examiner* — Matthew David Kim
(74) *Attorney, Agent, or Firm* — Lee & Hayes, P.C.

(57) ABSTRACT

In some embodiments, a first image may be captured from a first field of view using a first exposure time. A second image may be captured from a second field of view using a second exposure time that is different than the first exposure time. An overlapping field of view may be defined by an overlapping portion of the first field of view and the second field of view. Histograms may be created for the first image and the second image, and possibly more images that include different exposure times and represent the overlapping field of view. The histograms may be analyzed to determine a presence or an absence of a light source in the overlapping field of view.

20 Claims, 6 Drawing Sheets

(56) References Cited

U.S. PATENT DOCUMENTS

| | | | | |
|---|---|---|---|---|
| 2017/0374277 A1* | 12/2017 | Dobashi | .............. | H04N 5/23299 |
| 2018/0046187 A1* | 2/2018 | Martirosyan | .......... | G05D 1/106 |
| 2018/0063409 A1* | 3/2018 | Rivard | ................. | H04N 5/2258 |
| 2018/0118337 A1* | 5/2018 | Viel | ....................... | B64C 39/024 |
| 2018/0197015 A1* | 7/2018 | Cricri | ................. | G06K 9/00221 |

* cited by examiner

LIGHT SOURCE DETECTION IN FIELD OF VIEW

BACKGROUND

Some unmanned aerial vehicles (UAVs) are capable of travelling between destinations with little or no input from a human user. Although general route information may be determined in advance of a flight, an UAV may also need to dynamically sense and avoid obstacles such as buildings, trees, or even other vehicles while in route to a destination. Some UAVs utilize stereo vision systems to sense and avoid obstacles by comparing two or more images of the obstacles to calculate relative location and/or depth information associated with an obstacle. In particular, these systems can sense and locate an obstacle by first determining a disparity between two images containing the obstacle and then performing geometrical calculations using this determined disparity in conjunction with known camera geometry. The ability of a stereo camera system to generate quality imagery of obstacles correlates with the system's ability to determine the disparity and, therefore, to sense and avoid obstacles.

Light sources, including the sun, that are in a field of view of an imaging system, such as a stereo vision system, may cause undesirable results. For example, lights sources, such as the sun, may cause lens flare to occur in the cameras of a stereo camera system and this may hinder the system's ability to generate quality imagery that is usable for navigation. As another example, presence of light sources or white objects may result in sub-optimum exposure levels, which may result in imagery having lower quality than a potentially attainable quality had an optimal exposure level been used during image capture.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
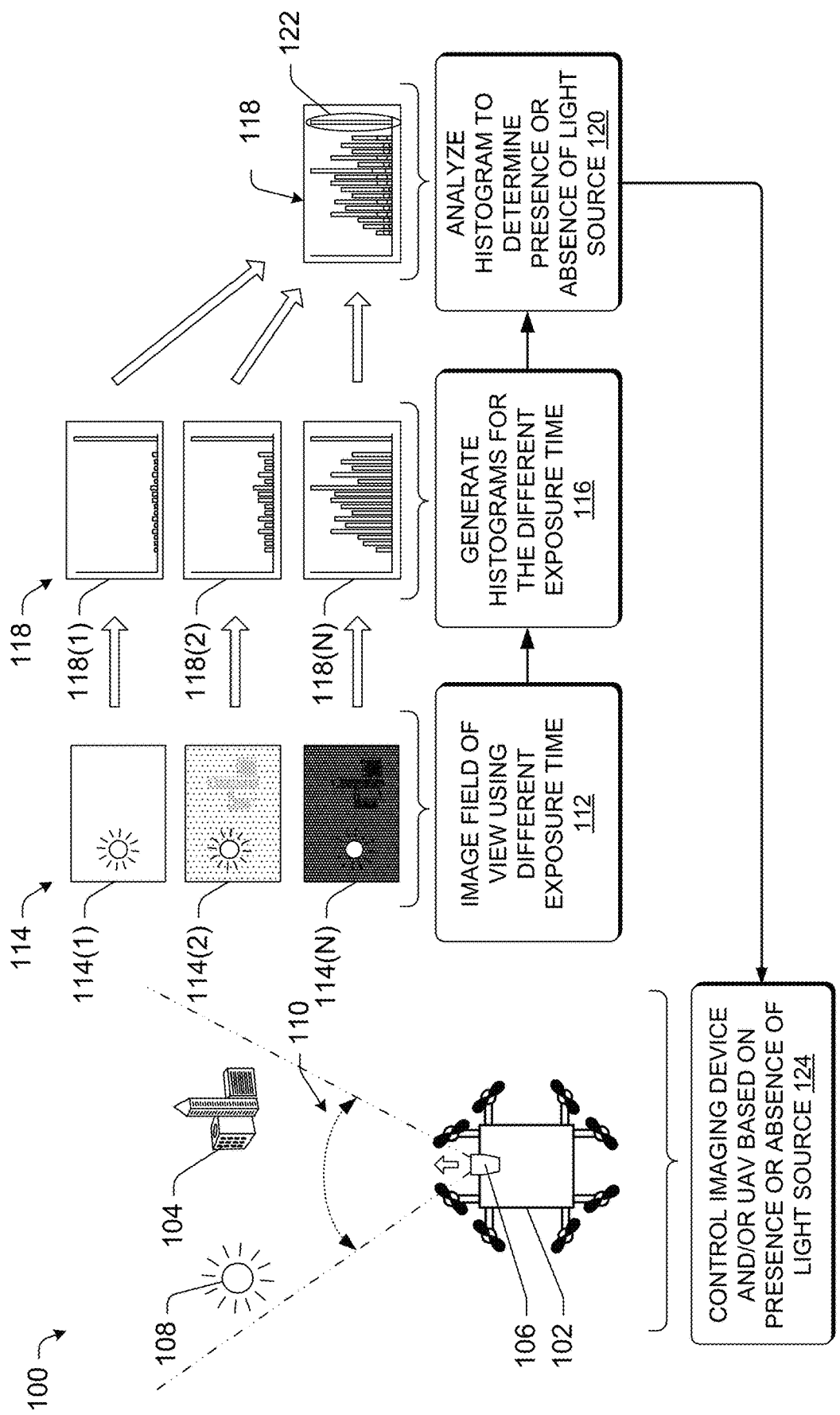
FIG. 1 is a pictorial flow diagram of an illustrative process to detect light sources in a field of view of an unmanned aerial vehicle (UAV).

This disclosure pertains, at least partly, to detecting light sources in imagery obtained by an unmanned aerial vehicle (UAV), which may be used for navigational purposes, among other possible uses. A light source may include the sun, an electrical light source (e.g., a light emitting diode (LED), halogen light, etc.), bright light emitted from hot objects, reflections from other light sources (reflection of the sun off of a mirror, etc.), and/or other sources of bright light that is mostly or predominantly white (e.g., greater than 90%). In some embodiments, a first image may be captured from a first field of view using a first exposure time (i.e., a length of time of the exposure). A second image may be captured from a second field of view using a second exposure time that is different than the first exposure time. An overlapping field of view may be defined by an overlapping portion of the first field of view and the second field of view. Histograms may be created for the first image and the second image, and possibly more images that include different exposure times and represent the overlapping field of view. The histograms may be analyzed to determine a presence or an absence of a light source in the overlapping field of view. For example, when the histograms include a consistent and relatively high value in a bin associated with saturation and/or white light (e.g., a bin value 255 in a standard histogram), then this consistent and relatively high value in the histograms may indicate a presence of at least one light source in the overlapping field of view. In contrast, when the histograms do not include a consistent and relatively high value in a bin associated with saturation and/or white light, then this result may indicate an absence of a light source in the overlapping field of view.

In a first example, the first and second image may capture imagery that shows a white landing marker located in a yard and surrounded by green grass. The histograms for the first and second images may fail to show consistent and relatively high values in a bin associated with saturation and/or white light because the first image taken at the shorter exposure time will show a lower value in the bin associated with saturation and/or white light as compared to the second image taken at a longer exposure time.

In a second example, the first and second image may capture imagery that shows a bright light source located in a yard and surrounded by green grass. The histograms for the first and second images may show consistent and relatively high values in a bin associated with saturation and/or white light because the first image taken at the shorter exposure time will show a high value in the bin associated with saturation and/or white light due to an intensity of the light emitted from the light source that is captured by an image sensor even under very short exposure times (e.g., $\frac{1}{1000}$ sec or less). Similarly, the second image taken at a longer exposure time will show a high value in the bin associated with white due to the light emitted from the light source. This consistency may be used to identify the light source. Therefore, analysis of the histograms in the first example will result in a determination of an absence of a light source in the field of view whereas analysis of the histograms in the second example will result in a determination of a presence of a light source in the field of view.

In various embodiments, following a determination of a presence of a light source in a field of view, further analysis may be performed. For instance, the first image, the second image, or both may be analyzed to determine a location of pixels associated with saturation and/or white light or having a high concentration of white or mostly white pixels (e.g., in bins 240-255 of a histogram), possibly as compared to a threshold. Using the location information, a quantity of light sources may also be determined, such as when more than one group of pixels includes a high concentration of white or mostly white pixels. The location of the light sources may be used for various purposes, and may inform a flight path of the UAV and/or an orientation of one or more cameras used to capture the images, among other possible uses.

In various embodiments, a UAV may include a propulsion system to propel the UAV to a destination and a stereo camera unit to record imagery of the route from at least two perspectives to cause a disparity between images, which is a difference between where an object is located in a first image as compared to a second image. The UAV may be configured to use the stereo camera unit to track obstacles so that they can be avoided during flight. The stereo camera unit may include a first camera and a second camera that have an overlapping field of view, and have the known disparity. The stereo camera may capture the first image using both cameras using a first exposure time and then capture the second image using a second exposure time, which is a sequential image capture process. In various embodiments, the first camera may capture the first image using a first exposure time. The second camera may capture the second image using a second exposure time that at least partially overlaps the first exposure time, which is a referred to as a parallel image capture process. This parallel image capture process may reduce an amount of time required to generate the imagery while creating a larger overlapping field of view as compared to the sequential image capture process.

The techniques, apparatuses, and systems described herein may be implemented in a number of ways. Example implementations are provided below with reference to the following figures.

FIG. 1 is a pictorial flow diagram of an illustrative process 100 to detect light sources in a field of view of a UAV. The order of the operations described below is not limiting, and thus the operations associated may be performed in a different order and/or some operations may be performed in parallel with other operations.

As shown in FIG. 1, a UAV 102 may navigate toward a destination 104. The UAV 102 may be equipped with one or more imaging devices 106, such as a stereo camera unit, that includes at least a first camera and a second camera. In some instances, a light source 108 may be in a field of view 110 of the imaging device(s) 106. The field of view 110 may be an overlapping field of view of multiple imaging device(s), such as when the stereo camera unit is deployed by the UAV 102. The light source 108 may be the sun, an electrical light source (e.g., a light emitting diode, halogen light, etc.), bright light emitted from hot objects, reflections from other light sources (reflection of the sun in a mirror, etc.), and/or other sources of bright light that is mostly or predominantly white.

At 112, the UAV 102 may capture imagery of the field of view 108 using different exposure times. For example, the image device(s) 106 may capture a first image 114(1) using a first exposure time, capture a second image 114(2) using a second, different exposure time, and capture a last image 114(N) using yet another different exposure time. However, more or fewer images may be captured to perform the process 100 described herein. The images 114 may include different amounts of light (e.g., white light or nearly white light) due to the difference in the exposure times.

At 116, the UAV 102 may generate histograms 118 for the images 114. For example, a first histogram 118(1) may be created for the first image 114(1), a second histogram 118(2) may be created for the second image 114(2), and a last histogram 118(N) may be created for the last image 114 (N).

At 120, the UAV 102 may analyze the histograms 118 to determine a presence or an absence of a light source (e.g., the light source 108) in the field of view 110. For example, when the histograms 118 include a consistent and relatively high value in a bin 122 associated with saturation and/or white light (e.g., a bin value 255 in a standard histogram) across the histograms, then this consistent and relatively high value may indicate a presence of at least one light source in the field of view 110. In contrast, when the histograms 118 do not include a consistent and relatively high value in the bin 122 associated with saturation and/or white light across the histograms, then this result may indicate an absence of the light source 108 in the field of view 110.

At 124, the UAV 102 may control the imaging device(s) 106 and/or the UAV based at least in part on the presence or absence of the light source 106 in the field of view 110. For example, the UAV may refrain from using the images that are associated with a presence of a light source for navigational purposes since the light source may cause incorrect distance calculations in some instances. The UAV 102 may perform a maneuver and/or reorient the imaging device(s) to remove the light source 108, when present, from the field of view 110. Other actions and/or operations may also be performed, as discussed below. In some embodiments, the image 114 may be analyzed to determine a location and/or quantity of light source(s) when a light source is determined to be present at the operation 120.

Although many of the operations described above were described as being performed by the UAV, the operations may be performed by other components and/or devices, which may be onboard the UAV or in communication with the UAV, such as a remote computing device in communication with the UAV via a radio network.

FIGS. 2-5 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes are described with reference to the items, vehicles, and/or devices described above and shown in FIG. 1. However, the processes may be performed in different environments, and possibly by different items, vehicles, and/or devices.

Figure 2:
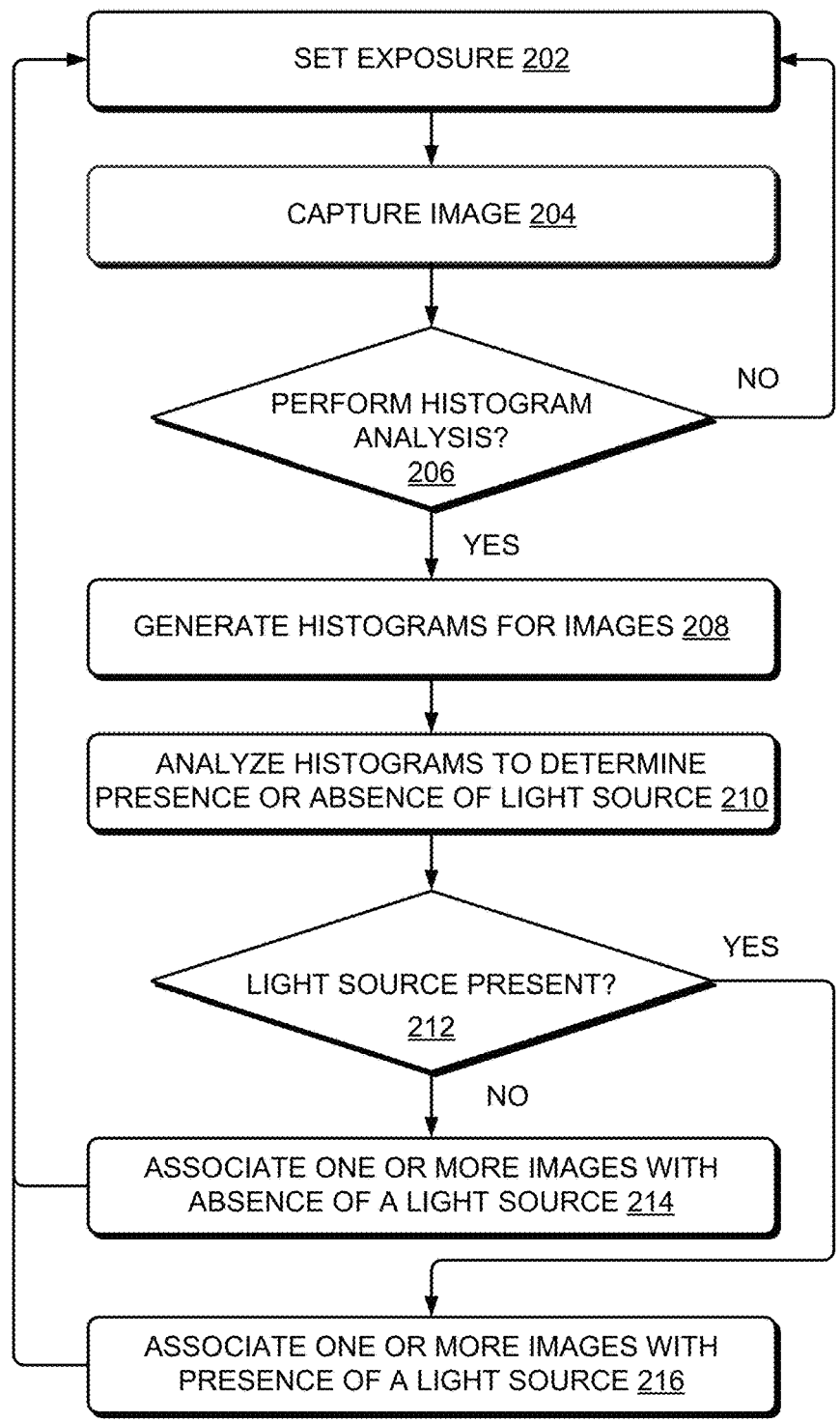
FIG. 2 is a flow diagram of an illustrative process to detect light sources in a field of view of a UAV.

FIG. 2 is a flow diagram of an illustrative process 200 to detect light sources in a field of view of a UAV. The process 200 may be performed by a UAV control system, such described below with reference of FIG. 6, by a remote computing device in communication with the UAV, and/or by other devices or components onboard or in communication with the UAV.

At 202, an exposure setting (e.g., a first exposure setting) for an imaging device may be determined and/or implemented by an imaging device. The imaging device may be a camera, a stereo camera pair, or other imaging devices that capture images that can be used to create histograms. The imaging device may deploy an auto-exposure algorithm to automatically set exposure based on various sensed conditions. The auto-exposure algorithm may be disabled or adjusted to implement certain exposure settings as set forth below for purposes of determine presence or absence of light sources in a field of view of the imaging device. The exposure setting may determine an exposure time and/or other attributes of an exposure, such as an aperture setting when a camera is configured to adjust aperture. Gain values may also be included in the exposure setting in some embodiments.

At 204, the imaging device may capture an image. The image may be a first image with a first field of view. In various embodiments, a processing system may receive a captured image. Thus, the operation 204 may include capturing or receiving a captured image.

At 206, a determination whether to perform a histogram analysis to determine a presence or absence of a light source may be made. When the histogram analysis is not to be performed (following the "no" route from the decision block 206), the process 200 may return to the operation 202 where the exposure setting may be adjusted at a second exposure setting to be different than the first exposure setting. For example, the second exposure setting may include a second exposure time that is shorter (or longer) in duration than a first exposure time associated with the first exposure setting. Following 202 (again), the process 200 may advance to the operation 204 to again capture a second image using the second exposure time, and then advance to the decision operation 206 to determine (again) whether to perform the histogram analysis to determine a presence or absence of a light source. In some embodiments, the imaging device(s) may continually set exposure and capture images via the operations 202 and 204, respectively. However, from time to time the decision operation 206 may cause performance of a histogram analysis to determine a presence or absence of a light source.

When the histogram analysis is to be performed (following the "yes" route from the decision operation 206), the process 200 may advance to an operation 208. At 208, histograms may be generated for images captured at the operation 204. For example, a first histogram may be created for a first image and a second histogram may be created for the second image. Typically the first image and second image may be captured in parallel, overlapping in exposure time (e.g., partially in parallel), or sequentially (one after another). However, the images may include intervening images as long as the first and second image include overlapping field of views.

At 210, the histograms may be analyzed to determine a presence or absence of a light source in the overlapping field of view between the first image and the second image (and possibly other images). For example, when the histograms include a consistent and relatively high value in a bin associated with saturation and/or white light (e.g., a bin value 255 in a standard histogram), then this consistent and relatively high value may indicate a presence of at least one light source in the overlapping field of view. In contrast, when the histograms do not include a consistent and relatively high value in the bin associated with saturation and/or white light, then this result may indicate an absence of the light source in the overlapping field of view. In some embodiments, analyzing s first histogram and a second histogram includes determining that a first amount of saturation and/or white light depicted in a first image and a second amount of saturation and/or white light depicted in a second image are within a threshold percentage or within a threshold value that indicates that the light source is present in the overlapping field of view.

At 212, a determination whether the light source is present is performed based on the analysis of the histograms from the operation 210. When the determination indicates an absence of a light source in the overlapping field of view (following the "no" route from the decision operation 212), then the process 200 may advance to an operation 214. At 214, the first image, second image, or both may be associated with an absence of a light source. In some embodiments, the images may include metadata or other associations that include a designation of a presence of a light source and/or an absence of a light source.

Returning to the decision operation 212, when the determination indicates a presence of a light source in the overlapping field of view (following the "yes" route from the decision operation 212), then the process 200 may advance to an operation 216. At 216, the first image, second image, or both may be associated with a presence of a light source.

Following the operations 214 and/or 216, the process 200 may advance to the operation 202. During the processing of at least some of the operations 206-216, additional occurrences of the operations 202 and/or 204 may take place. In various embodiments when multiple imaging devices are used, including stereo camera units, the operations 202 and 204 may be performed in parallel or with overlapping exposure times. For example, a first camera may capture a first image during a first exposure time while a second camera may capture a second image during second exposure time. The first exposure time (period of time) may overlap with the second exposure time, at least partly.

Figure 3:
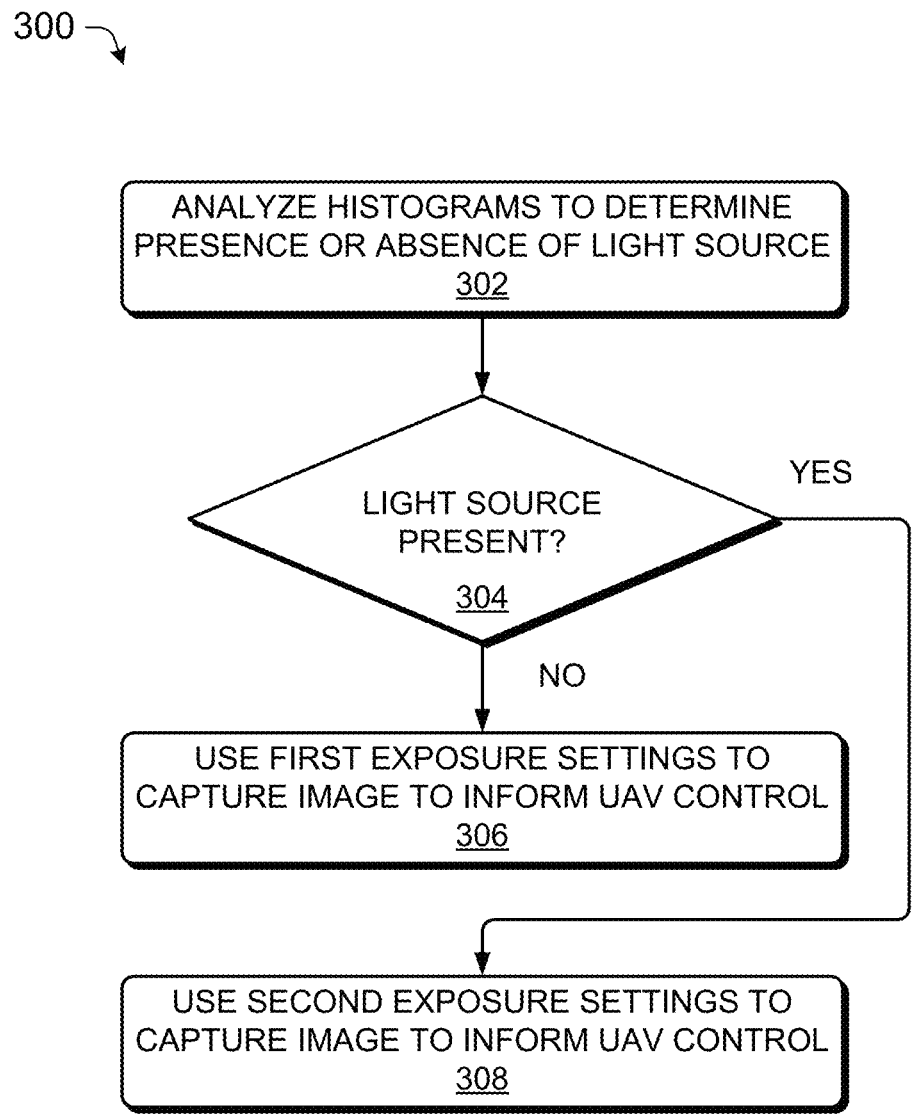
FIG. 3 is a flow diagram of an illustrative process to modify an exposure based on whether a light source is present in a field of view.

FIG. 3 is a flow diagram of an illustrative process 300 to modify an exposure based on whether a light source is present in a field of view. The process 300 may be performed by a UAV control system, such described below with reference of FIG. 6, by a remote computing device in communication with the UAV, and/or by other devices or components onboard or in communication with the UAV.

At 302, the histograms may be analyzed to determine a presence or absence of a light source in the overlapping field of view between the first image and the second image (and possibly other images). The operation 302 may be similar to the operation 210 described above with reference to the process 200 shown in FIG. 2. The operations 202-208 from the process 200 may precede the operation 302 in some embodiments. For example, when the histograms include a consistent and relatively high value in a bin associated with saturation and/or white light, then this consistent and relatively high value may indicate a presence of at least one light source in the overlapping field of view. In contrast, when the histograms do not include a consistent and relatively high value in the bin associated with saturation and/or white light, then this result may indicate an absence of the light source in the overlapping field of view.

At 304, a determination whether the light source is present is performed based on the analysis of the histograms from the operation 302. When the determination indicates an absence of a light source in the overlapping field of view (following the "no" route from the decision operation 304), then the process 300 may advance to an operation 306. At 306, the imaging device may adjust the exposure to a first exposure setting to capture an image, such as an image to inform navigation or control of the UAV. The first exposure setting may include an exposure time, a gain setting, and/or other settings (depending on the configuration of the image sensor(s)), to capture an image having certain attributes, such as a histogram with generally wide distribution across bins in the histogram and absent high concentration of values in bins associated with black or white, for example. In particular, the operation 306 may select exposure settings that enable capture of imagery of a white or mostly white object, such as a landing marker, while providing adequate contrast and image details of other objects proximate to the white or mostly white object.

Returning to the decision operation 304, when the determination indicates a presence of a light source in the overlapping field of view (following the "yes" route from the decision operation 304), then the process 300 may advance to an operation 308. At 308, the imaging device may adjust the exposure to a second exposure setting to capture an image, such as an image to inform navigation or control of the UAV. The second exposure setting may include an exposure time, a gain setting, and/or other settings (depending on the configuration of the image sensor(s)), to capture an image having certain attributes, such as a histogram with generally wide distribution across bins in the histogram and absent high concentration of values in bins associated with black or white, for example.

Figure 4:
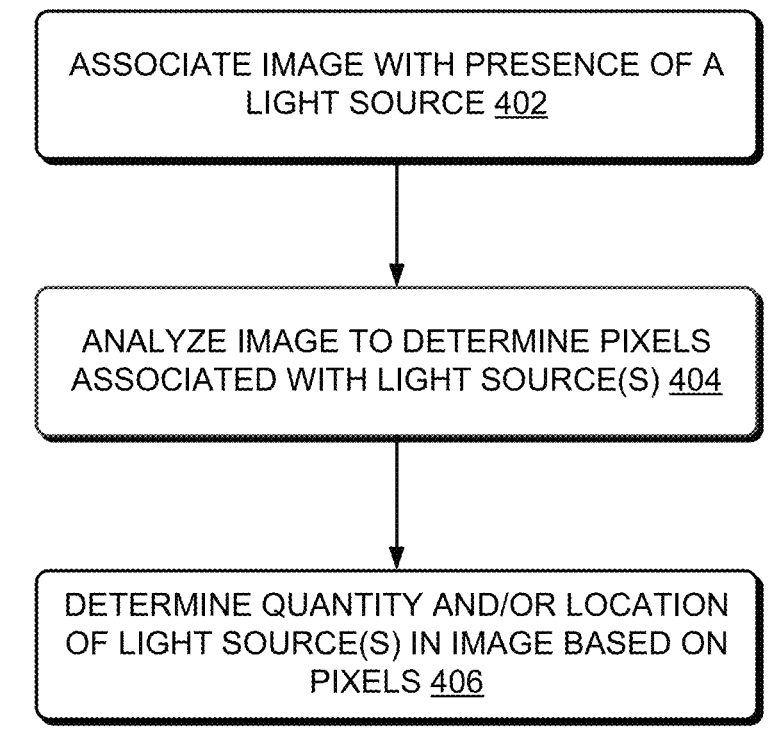
FIG. 4 is a flow diagram of an illustrative process to determine a quantity and location of one or more light sources in a field of view.

FIG. 4 is a flow diagram of an illustrative process 400 to determine a quantity and location of one or more light sources in a field of view. The process 400 may be performed by a UAV control system, such described below with reference of FIG. 6, by a remote computing device in communication with the UAV, and/or by other devices or components onboard or in communication with the UAV.

At 402, an image may be associated with a presence of a light source. The operation 402 may be similar to the operation 216 described above with reference to the process 200 shown in FIG. 2. The operations 202-214 from the process 200 may precede the operation 402 in some embodiments.

At 404, the image, or another similar image, may be analyzed to determine pixels associated with light sources. For example, the image, and possibly other associated image (captured using different exposure times) may be analyzed to determine groups and/or clusters of pixels that are white or mostly white, which may indicate a location of a light source. In some embodiments, multiple group different groups of pixels may be identified in the image(s). To identify the pixels, the analysis may identify pixels that are white or mostly white despite changes in the exposure time, even at very short exposure times less than 1/1000 sec, for example.

At 406, a quantity and/or location of the light source or light sources in the image (and in the field of view) may be determined based on the pixels determined in the operation 404. For example, discrete groups or clusters of pixels may be associated with different light sources, and may be counted to determine a quantity of light sources when more than one light source is present. Demarcations between groups of pixels, shapes of groups of pixels, and/or other attributes of the pixels may be used to identify a particular light source, such as the sun, an electronic light source, and so forth.

Figure 5:
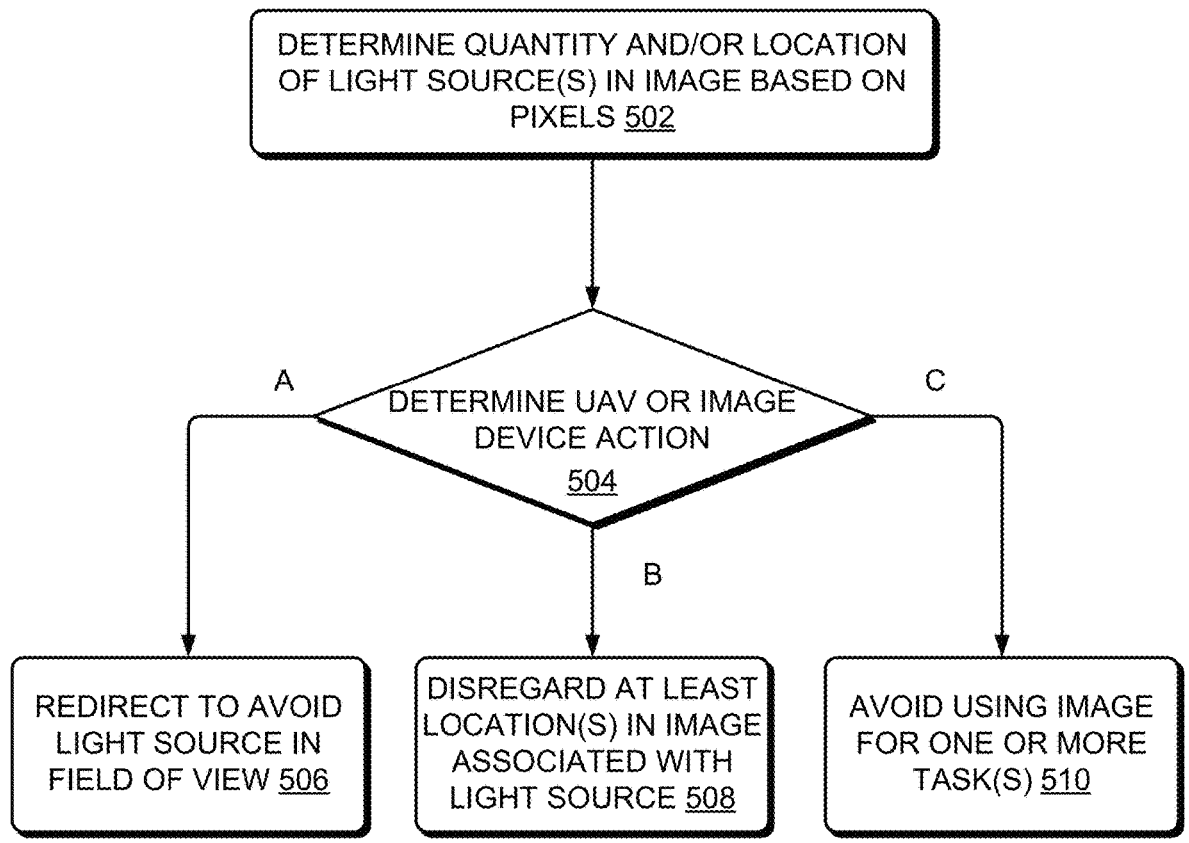
FIG. 5 is a flow diagram of an illustrative process to determine a UAV or image device action based on detection of a presence of a light source in a field of view.

In some embodiments, the location of the light sources may be translated into location in the field of view (in real space) and used for navigational purposes and/or for other purposes. For example, when a light source is detected in a left side of a field of view, this information may be used by a navigation system or flight controller to cause the UAV to maneuver right and away from the light source to remove the light source from the field of view. Other possible actions may be performed using the location information of the light sources, as discussed below and elsewhere in this description FIG. 5 is a flow diagram of an illustrative process 500 to determine a UAV or image device action based on detection of a presence of a light source in a field of view. The process 500 may be performed by a UAV control system, such described below with reference of FIG. 6, by a remote computing device in communication with the UAV, and/or by other devices or components onboard or in communication with the UAV. At 502, a quantity and/or location of the light source or light sources in the image (and in the field of view) may be determined. The operation 502 may be similar to the operation 406 described above with reference to the process 400 shown in FIG. 2. At least the operations 402-404 from the process 400 may precede the operation 502 in some embodiments. For example, at 502, the quantity and/or location may be determined based on groups of pixels that are white or mostly white. For example, discrete groups or clusters of pixels may be associated with different light sources, and may be counted to determine a quantity of light sources when more than one light source is present. Demarcations between groups of pixels, shapes of groups of pixels, and/or other attributes of the pixels may be used to identify a particular light source, such as the sun, an electronic light source, and so forth.

At 504, a determination of an action performed by a UAV, one or more imaging device(s), or other devices (possibly included remote devices), may be performed. The decision operation 504 shows three possible outcomes "A," "B," and "C", however, these outcomes are not exhaustive of all outcomes discussed herein or of all conceivable outcomes that may benefit operation of the UAV and/or operation of the imaging device(s).

Following route "A" from the decision operation 504, the process 500 may advance to an operation 506. At 506, the UAV and/or one or more image sensors may be redirected to avoid the light source being in the field of view. For example, a navigation system and/or flight controller may cause the UAV to make a maneuver that results in the light source being outside of the field of view of the imaging device or imaging devices. In some embodiments, the location of the light source in the image may inform the navigation system and/or flight controller, such as to enable deviation form a current path in order to remove the light source from the field of view. In various embodiment, when imaging devices are configured for reorientation, one or more imaging device(s) may be reoriented to remove the light source from the field of view. For example, one or more actuators may be used to change an orientation of an imaging device relative to the UAV for such purposes. In accordance with one or more embodiments, mechanisms may be used to block the light source(s) from the field of view, such as by deploying blinders, moving a mechanical member between a lens of the imaging device and the light source to block light from the light source, and so forth. In some embodiments, a zoom lens may be used to zoom in to narrow a field of view such that the light source is no longer included in the field of view.

Following route "B" from the decision operation 504, the process 500 may advance to an operation 508. At 508, at least portions of the image associated with the light source may be disregarded. In some embodiments, the entire image may be disregarded or otherwise not used for a particular purpose. For example, the group of pixels identified as a light source may not be used for certain operations, such as object identification, distance calculations, or other purposes, while other pixels in the image may be used for certain purposes.

Following route "C" from the decision operation 504, the process 500 may advance to an operation 510. At 510, the image may be used for some purposes, but not other purposes. For example, the UAV may use the image to track a location of a previously identified object, such as the ground, another UAV, or another object, but may refrain from using the image for distance calculations which may be skewed or otherwise made inaccurate due to presence of the light source. For example, presence of a light source in the field of view may lead to ghosting of images, flare, or other imagery phenomenon, which may create errors in distance calculations and/or in other operations that rely on the image.

Figure 6:
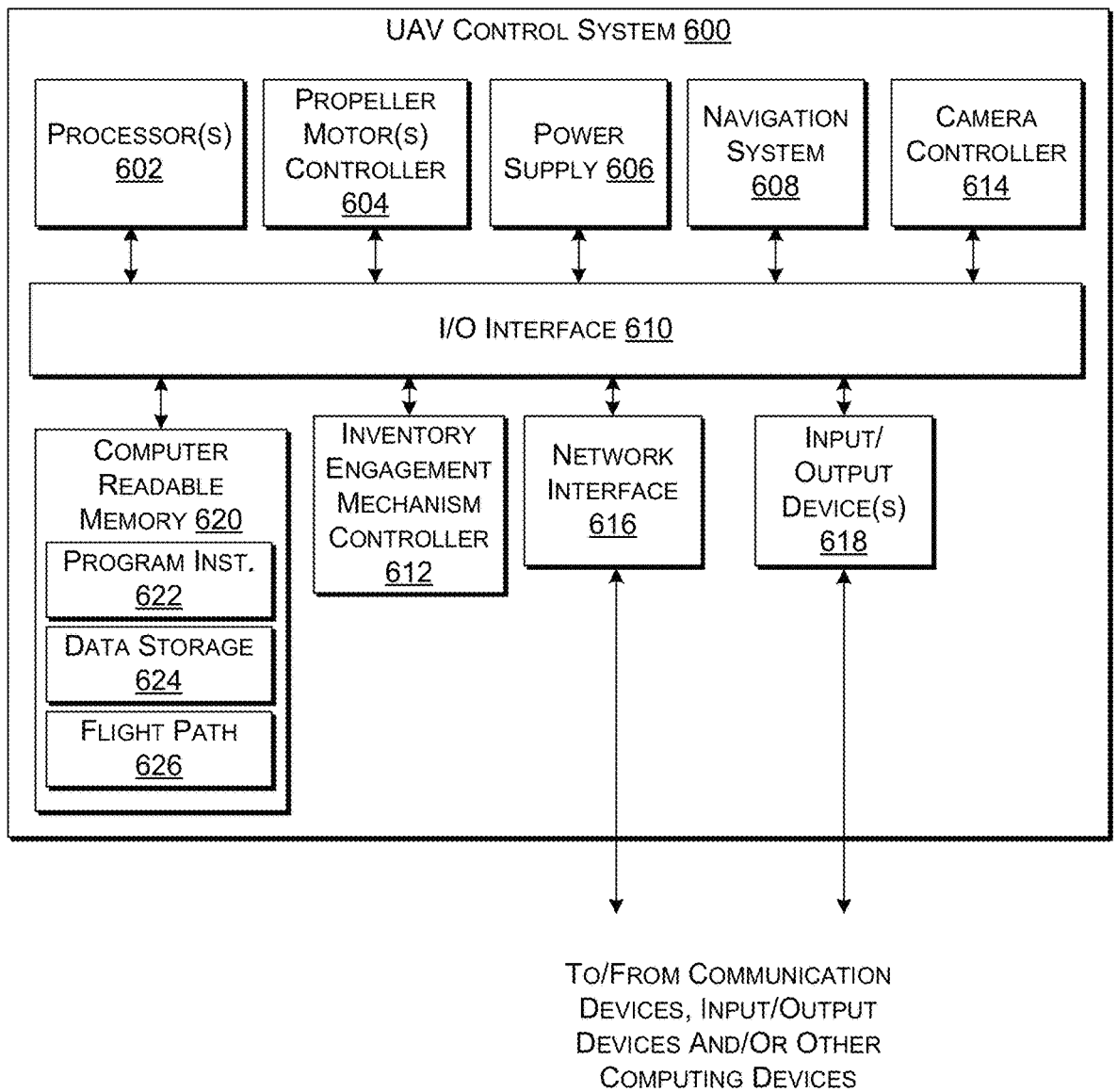
FIG. 6 is a block diagram of an illustrative control system of a UAV configured to detect light sources in a field of view of the UAV.

FIG. 6 is a block diagram of an illustrative control system 600 of a UAV configured to detect light sources in a field of view of the UAV. In various examples, the block diagram may be illustrative of one or more aspects of the UAV control system 600 that may be used to implement the various systems, devices, and techniques discussed herein. In the illustrated implementation, the UAV control system 600 includes one or more processors 602, coupled to a non-transitory computer readable storage medium 620 via an input/output (I/O) interface 610. The UAV control system 600 may also include a propeller motor controller 604, power supply module 606 and/or a navigation system 608. The UAV control system 600 may further include an inventory engagement mechanism controller 612, a camera controller 614, a network interface 618, and one or more input/output devices 616.

In various implementations, the UAV control system 600 may be a uniprocessor system including one processor 602, or a multiprocessor system including several processors 602 (e.g., two, four, eight, or another suitable number). The processor(s) 602 may be any suitable processor capable of executing instructions. For example, in various implementations, the processor(s) 602 may be general-purpose or embedded processors implementing any of a variety of instruction set architectures (ISAs), such as the x66, PowerPC, SPARC, or MIPS ISAs, or any other suitable ISA. In multiprocessor systems, each processor(s) 602 may commonly, but not necessarily, implement the same ISA.

The non-transitory computer readable storage medium 620 may be configured to store executable instructions, data, flight paths, and/or data items accessible by the processor(s) 602. In various implementations, the non-transitory computer readable storage medium 620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 620 as program instructions 622, data storage 624 and flight path data 626, respectively. In other implementations, program instructions, data and/or flight paths may be received, sent or stored upon different types of computer-accessible media, such as non-transitory media, or on similar media separate from the non-transitory computer readable storage medium 620 or the UAV control system 600. Generally speaking, a non-transitory, computer readable storage medium may include storage media or memory media such as flash memory (e.g., solid state memory), magnetic or optical media (e.g., disk) coupled to the UAV control system 600 via the I/O interface 610. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 618.

In one implementation, the I/O interface 610 may be configured to coordinate I/O traffic between the processor(s) 602, the non-transitory computer readable storage medium 620, and any peripheral devices, the network interface or other peripheral interfaces, such as input/output devices 616. In some implementations, the I/O interface 610 may perform any necessary protocol, timing or other data transformations to convert data signals from one component (e.g., non-transitory computer readable storage medium 620) into a format suitable for use by another component (e.g., processor(s) 602). In some implementations, the I/O interface 610 may include support for devices attached through various types of peripheral buses, such as a variant of the Peripheral Component Interconnect (PCI) bus standard or the Universal Serial Bus (USB) standard, for example. In some implementations, the function of the I/O interface 610 may be split into two or more separate components, such as a north bridge and a south bridge, for example. Also, in some implementations, some or all of the functionality of the I/O interface 610, such as an interface to the non-transitory computer readable storage medium 620, may be incorporated directly into the processor(s) 602.

The propeller motor(s) controller 604 communicates with the navigation system 608 and adjusts the power of each propeller motor to guide the UAV along a determined flight path which may be dynamically updated to avoid obstacles identified based on imagery captured by a stereo camera unit communicatively coupled to the camera controller 614. The power supply module 606 may control the charging and any switching functions associated with one or more power modules (e.g., batteries) of the UAV.

The navigation system 608 may include a GPS or other similar system that can be used to navigate the UAV to and/or from a location. The inventory engagement mechanism controller 612 communicates with the actuator(s) or motor(s) (e.g., a servo motor) used to engage and/or disengage inventory. For example, when the UAV is positioned over a level surface at a delivery location, the inventory engagement mechanism controller 612 may provide an instruction to a motor that controls the inventory engagement mechanism to release the inventory. The inventory may be released from an external position or may be released from an internal cargo bay of the UAV.

The camera controller 614 may operate to perform one or more operations discussed herein with relation to image capture while travelling along a route to a destination. For example, the camera controller 614 may record imagery of the route from two or more perspectives, e.g. using two or more different cameras, to sense and avoid obstacles along a route. The camera controller 614 may modify exposure settings and/or generate histograms, among other possible operations. In particular, the camera controller 614 may perform any operations discussed in relation to FIGS. 1-5.

The network interface 618 may be configured to allow data to be exchanged between the UAV control system 600, other devices attached to a network, such as other computer systems, and/or with UAV control systems of other UAVs. For example, the network interface 618 may enable wireless communication between numerous UAVs. In various implementations, the network interface 618 may support communication via wireless general data networks, such as a Wi-Fi network. For example, the network interface 618 may support communication via telecommunications networks such as cellular communication networks, satellite networks, and the like.

Input/output devices 616 may, in some implementations, include one or more displays, image capture devices, thermal sensors, infrared sensors, time of flight sensors, accelerometers, pressure sensors, weather sensors, airflow sensors, etc. Multiple input/output devices 616 may be present and controlled by the UAV control system 600. One or more of these sensors may be utilized to assist in landings as well as avoiding obstacles during flight.

As shown in FIG. 6, the memory may include program instructions 622 which may be configured to implement the example processes and/or sub-processes described above. The data storage 624 may include various data stores for maintaining data items that may be provided for sensing and avoiding obstacles, determining flight paths, retrieving inventory, landing, identifying a level surface for disengaging inventory, etc. In some embodiments, the program instructions may be used to perform any of the operations discussed with reference to the FIGS. 1-5, such as creating histograms, analyzing histograms, analyzing images for groups of white or mostly white pixels, and/or other operations discussed herein.

In various implementations, the parameter values and other data may be combined with other information or may be partitioned differently into more, fewer, or different data structures. In some implementations, data stores may be physically located in one memory or may be distributed among two or more memories.

Those skilled in the art will appreciate that the UAV control system 600 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV control system 600 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 600. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV control system 600 may be transmitted to the UAV control system 600 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations. Additionally, while the term Unmanned Aerial Vehicle (UAV) is used throughout this disclosure, a person having ordinary skill will appreciate that the embodiments disclosed herein may be applicable to land, sea, air, or space vehicles, whether those vehicles are "manned" or "unmanned. Additionally, vehicles described herein may be autonomously controlled, locally controlled, or remotely controlled without departing from the scope of the embodiments disclosed.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An unmanned aerial vehicle (UAV), comprising:
    a UAV frame configured to support components of the UAV;
    a propulsion system coupled to the UAV frame, the propulsion system to generate thrust to propel the UAV along a route toward a destination;
    a stereo camera unit coupled to the UAV frame, the stereo camera unit recording at least first imagery of the route with a first camera and recording at least second imagery of the route with a second camera, wherein the first camera and the second camera are offset to cause disparity between the first imagery and the second imagery;
    one or more processors; and
    memory coupled to the one or more processors, the memory including instructions that are executable by the one or more processors to perform operations comprising:
        capturing a first image and a second image, the first image and the second image including an overlapping field of view, wherein a first exposure time used to capture the first image is different than a second exposure time used to capture the second image;
        creating a first histogram for the first image and a second histogram for the second image;
        analyzing the first histogram to determine a first value of a first bin associated with the first image;
        analyzing the second histogram to determine a second value of a second bin associated with the second image;
        determining, based at least in part on a difference between the first value and the second value, at least one of a presence or an absence of two or more light sources in the overlapping field of view, wherein the difference being within at least one of a threshold percentage or a threshold value indicates the presence of the two or more light sources;
        associating at least one of the first image or the second image with at least one of the presence or the absence of the two or more light sources;
        determining at least one of a quantity of the two or more light sources in the overlapping field of view or a location of the two or more light sources in the overlapping field of view; and
        causing, based at least in part on the at least one of the quantity of the two or more light sources or the location of the two or more light sources in the overlapping field of view, the UAV to maneuver from a current path to a different path such that the two or more light sources are outside of the overlapping field of view.

2. The UAV as recited in claim 1, wherein:
the first image is captured by the first camera during the first exposure time, and
the second image is captured by the second camera during the second exposure time that at least partially overlaps the first exposure time.

3. The UAV as recited in claim 1, the operations further comprising, in response to associating at least one of the first image or the second image with the presence of the light source, analyzing at least one of the first image or the second image to determine the at least one of the quantity of the two or more light sources in the overlapping field of view or the location of the two or more light sources in the overlapping field of view.

4. The UAV as recited in claim 1, the operations further comprising, in response to associating at least one of the first image or the second image with the presence of the two or more light sources, causing the UAV to refrain from using at least one of the first image or the second image for at least one of navigation or flight control.

5. The UAV as recited in claim 1, the operations further comprising:
in response to associating at least one of the first image or the second image with the presence of the two or more light sources, analyzing at least one of the first image or the second image to determine the location of the two or more light sources in the overlapping field of view; and
causing, using one or more actuators associated with the UAV, the stereo camera unit to adjust from a first orientation to a second orientation based at least in part on the location of the two or more light sources in the overlapping field of view.

6. The UAV as recited in claim 1, further comprising a mechanism configured to block the two or more light sources from view based at least in part on determining the location of the two or more light sources in the overlapping field of view.

7. The UAV as recited in claim 6, wherein the mechanism includes one or more blinders that deploy a mechanical member between a lens of at least one of the first camera or the second camera and the two or more light sources.

8. A computer-implemented method comprising:
receiving a first image using a first exposure setting that includes a first exposure time, the first image having a first field of view;
creating a first histogram associated with the first image;
receiving a second image using a second exposure setting that includes a second exposure time, the second image having a second field of view, the second field of view at least partially overlapping with the first field of view as an overlapping field of view, the second exposure time being different than the first exposure time;
creating a second histogram associated with the second image;
analyzing the first histogram to determine a first value of a first bin associated with the first image;
analyzing the second histogram to determine a second value of a second bin associated with the second image;
determining, based at least in part on a difference between the first value and the second value, at least one of a presence or absence of two or more light sources in the overlapping field of view, wherein the difference being within at least one of a threshold percentage or a threshold value indicates the presence of the two or more light sources;
associating at least one of the first image or the second image with at least one of the presence or the absence of the two or more light sources;
determining at least one of a quantity of the two or more light sources or a location of the two or more light sources in the overlapping field of view; and
causing a vehicle to maneuver such that the two or more light sources are outside of the overlapping field of view.

9. The computer-implemented method of claim 8, further comprising:
in response to the first image being associated with the presence of the two or more light sources, detecting one or more group of pixels that includes at least one of white pixels or mostly white pixels; and
determining the at least one of the quantity of the two or more light sources or the location of the two or more light sources in the overlapping field of view based at least in part on the one or more group of pixels.

10. The computer-implemented method of claim 8, further comprising causing a zoom lens to zoom in and narrow the overlapping field of view such that the two or more light sources, when present in the overlapping field of view, are excluded from the overlapping field of view in a subsequent image.

11. The computer-implemented method of claim 8, wherein the vehicle is an unmanned aerial vehicle (UAV), further comprising causing, using one or more actuators associated with the UAV, a camera associated with the UAV to adjust from a first position to a second position to cause the two or more light sources, when present in the overlapping field of view, to be excluded from the overlapping field of view in a subsequent image.

12. The computer-implemented method of claim 8, further comprising refraining from using at least one of the first image or the second image when the two or more light sources are determined to be present.

13. The computer-implemented method of claim 8, further comprising at least one of:
in response to the first image being associated with the presence of the two or more light sources, selecting a third exposure setting to capture a third image; or
in response to the first image being associated with the absence of the two or more light sources, selecting a fourth exposure setting to capture the third image.

14. The computer-implemented method of claim 8, further comprising;
causing a first camera to implement the first exposure setting at a first time and a second camera to implement the second exposure setting at a second time; and
causing the first exposure setting at the first time to at least partially overlap the second exposure setting at the second time.

15. A system comprising:
one or more processors;
memory coupled to the one or more processors, the memory including one or more computer-executable instructions that are executable by the one or more processors to perform operations comprising:
capturing a first image using a first exposure time, the first image having a first field of view;
capturing a second image using a second exposure time, the second image having a second field of view that at least partially overlaps with the first field of view as an overlapping field of view, the second exposure time being different than the first exposure time;

creating a first histogram for the first image and a second histogram for the second image;

determining, in the first histogram, a first value of a first bin associated with the first image;

determining, in the second histogram, a second value of a second bin associated with the second image;

determining, based at least in part on a difference between the first value and the second value, at least one of a presence or absence of two or more light sources in the overlapping field of view;

associating at least one of the first image or the second image with at least one of the presence or the absence of the two or more light sources;

determining at least one of a quantity of the two or more light sources or a location of the two or more light sources in the overlapping field of view; and causing a vehicle to maneuver such that the two or more light sources are outside of the overlapping field of view.

16. The system as recited in claim 15, wherein the first value and second value are at least one of outside of a threshold percentage or outside of a threshold value indicating that the two or more light sources are absent from the overlapping field of view.

17. The system as recited in claim 15, further comprising a zoom lens, and wherein the operations further comprise causing the zoom lens to zoom in and narrow the overlapping field of view such that the two or more light sources, when present in the overlapping field of view, are excluded from the overlapping field of view in a subsequent image.

18. The system as recited in claim 15, wherein the operations further comprise at least one of:

in response to the first image being associated with the presence of the two or more light sources, selecting a third exposure time to capture a third image; or in response to the first image being associated with the absence of the two or more light sources, selecting a fourth exposure time to capture the third image.

19. The system as recited in claim 15, further comprising a stereo camera unit to capture the first image and the second image, the stereo camera unit including a first camera and a second camera, wherein the first image is captured after the second image.

20. The system as recited in claim 15, further comprising a stereo camera unit to capture the first image and the second image, the stereo camera unit including a first camera and a second camera, wherein the first image is captured at the first exposure time by the first camera and the second image is captured at the second exposure time by the second camera, wherein the second exposure time at least partially overlapping with the first exposure time.

* * * * *